US009625854B2

(12) United States Patent
Koyanagi et al.

(10) Patent No.: US 9,625,854 B2
(45) Date of Patent: Apr. 18, 2017

(54) DEVELOPER CARRYING MEMBER, ELECTROPHOTOGRAPHIC PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Takashi Koyanagi, Mishima (JP); Minoru Nakamura, Mishima (JP); Seiji Tsuru, Susono (JP); Kazuaki Nagaoka, Susono (JP); Yuto Miyauchi, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 14/714,833

(22) Filed: May 18, 2015

(65) Prior Publication Data

US 2015/0355570 A1 Dec. 10, 2015

(30) Foreign Application Priority Data

Jun. 5, 2014 (JP) ................................. 2014-117072

(51) Int. Cl.
*B32B 9/04* (2006.01)
*G03G 15/08* (2006.01)

(52) U.S. Cl.
CPC .. *G03G 15/0818* (2013.01); *Y10T 428/31504* (2015.04)

(58) Field of Classification Search
CPC ........ C08G 18/10; C08G 18/12; C08G 18/48; C08G 18/62; C08G 18/6216; C08G 18/83;
(Continued)

(56) References Cited

U.S. PATENT DOCUMENTS 5,475,473 A 12/1995 Masuda et al.
8,417,163 B2 4/2013 Yoshizawa et al.
(Continued)

FOREIGN PATENT DOCUMENTS

JP 57-5047 A 1/1982
JP 3360432 B2 12/2002
(Continued)

*Primary Examiner* — Thao T Tran

(74) *Attorney, Agent, or Firm* — Fitzpatrick Cella Harper and Scinto

(57) ABSTRACT

Provided are a developer carrying member, and a process cartridge and an electrophotographic apparatus using the developer carrying member, the developer carrying member including a substrate, an elastic layer, and a surface layer covering a surface of the elastic layer in which the surface layer contains a modified acrylic resin, and the modified acrylic resin has a constituent unit represented by the following structural formula (1).

(1)

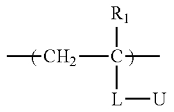

(R1 represents an alkyl group having 1 to 3 carbon atoms; U represents a urethane resin having, between two adjacent urethane bonds, a structure represented by the following structural formula (2), and at least one of structure selected from a structure represented by the following structural formula (3) and a structure represented by the following structural formula (4); and L represents a divalent linking group containing an ester bond (—O—C(=O)—)).
(Continued)

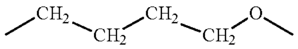

(2)

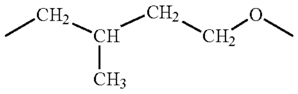

(3)

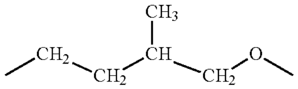

(4)

5 Claims, 3 Drawing Sheets

(58) Field of Classification Search
CPC ........ G03G 15/0818; Y10T 428/31393; Y10T 428/31504; Y10T 428/31551
USPC .................... 399/279; 428/423.1; 528/44, 75
See application file for complete search history.

(56) References Cited

U.S. PATENT DOCUMENTS

| | | | |
|---|---|---|---|
| 8,655,222 B2 | 2/2014 | Nakamura et al. | |
| 8,768,227 B2 | 7/2014 | Urushihara et al. | |
| 8,798,508 B2 | 8/2014 | Yamada et al. | |
| 8,874,007 B2 | 10/2014 | Kawamura et al. | |
| 8,874,012 B2 | 10/2014 | Yamada et al. | |
| 2003/0149227 A1* | 8/2003 | Okazaki .................. | C08F 20/28 528/310 |
| 2014/0079442 A1* | 3/2014 | Yamada ............. | G03G 15/0818 399/286 |

FOREIGN PATENT DOCUMENTS

| | | |
|---|---|---|
| JP | 2011-186433 A | 9/2011 |
| JP | 2014-29499 A | 2/2014 |

* cited by examiner

DEVELOPER CARRYING MEMBER, ELECTROPHOTOGRAPHIC PROCESS CARTRIDGE, AND ELECTROPHOTOGRAPHIC IMAGE FORMING APPARATUS

BACKGROUND OF THE INVENTION

Field of the Invention

The present invention relates to a developer carrying member to be used in an electrophotographic image forming apparatus, and an electrophotographic process cartridge and an electrophotographic image forming apparatus using the developer carrying member.

Description of the Related Art

In an electrophotographic image forming apparatus, a photosensitive member is charged by a charging unit, and an electrostatic latent image is formed on the photosensitive member with a laser. Then, a developer (hereinafter sometimes referred to as "toner") in a developing container is conveyed by a developing member, and the electrostatic latent image on the photosensitive member is developed with the toner in a portion where the photosensitive member and the developing member are brought into close contact with each other. After that, the toner on the photosensitive member is transferred onto a recording sheet by a transferring unit and fixed onto the recording sheet with heat and a pressure. As one of developing members to be used in the above-mentioned developing method, there is given a developer carrying member having such a configuration that an elastic layer is formed on the periphery of a metallic core, and a single surface layer or a plurality of surface layers are formed on the elastic layer as required.

In an image forming apparatus of a nonmagnetic one-component contact developing system, an electroconductive electrophotographic member having an electric resistance of from $10^3$ Ω·cm to $10^{10}$ Ω·cm is generally used as the developer carrying member.

In recent years, the performance required of the developing member to be used in an apparatus adopting an electrophotographic system has been becoming higher, and from the viewpoints of high image quality and high durability, a developing member such as a two-layer developer carrying member including a surface layer on a surface of an elastic layer has come into widespread use.

As the surface layer of the developing member, a urethane resin excellent in wear resistance and charge imparting property to a toner is widely used. In recent years, in order to further enhance a function, there has been proposed an improvement method for the surface layer. Japanese Patent Application Laid-Open No. 2011-186433 discloses a technology of enhancing scratch resistance and the speed of damage restoration by incorporating an acrylic resin into a urethane resin. Further, Japanese Patent Application Laid-Open No. 2014-29499 discloses a technology of enhancing deformation recoverability and filming resistance by incorporating an acrylic resin into a polyether-based urethane resin having a particular structure.

In view of the foregoing, the present invention provides a developer carrying member in which a ghost or filming is less liable to occur even in a severe environment.

Further, the present invention provides an electrophotographic image forming apparatus and an electrophotographic process cartridge that contribute to stable output of an electrophotographic image of high quality.

SUMMARY OF THE INVENTION

That is, according to one embodiment of the present invention, there is provided a developer carrying member, including:

an electroconductive substrate;

an elastic layer on the substrate; and a surface layer covering a surface of the elastic layer, the surface layer containing a modified acrylic urethane resin, the modified acrylic urethane resin having a constituent unit represented by the following structural formula (1).

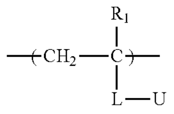

(1)

In the structural formula (1), R1 represents an alkyl group having 1 to 3 carbon atoms. U represents a urethane resin having, between two adjacent urethane bonds, a structure represented by the following structural formula (2), and at least one structure selected from a structure represented by the following structural formula (3) and a structure represented by the following structural formula (4). L represents a divalent linking group containing an ester bond (—O—C(═O)—).

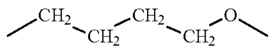

(2)

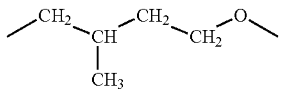

(3)

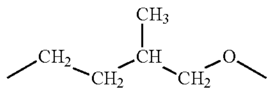

(4)

According to another embodiment of the present invention, there is provided an electrophotographic process cartridge, including: a photosensitive member on which an electrostatic latent image is to be formed; and a developing member configured to develop the electrostatic latent image on the photosensitive member, the electrophotographic process cartridge being removably mounted onto a main body of an electrophotographic image forming apparatus, in which the developing member includes the above-mentioned developer carrying member.

According to still another embodiment of the present invention, there is provided an electrophotographic image forming apparatus, including: a photosensitive member on which an electrostatic latent image is to be formed; and a developing member configured to develop the electrostatic latent image on the photosensitive member, in which the developing member includes the above-mentioned developer carrying member.

Further features of the present invention will become apparent from the following description of exemplary embodiments with reference to the attached drawings.

DESCRIPTION OF THE EMBODIMENTS

Figure 1:
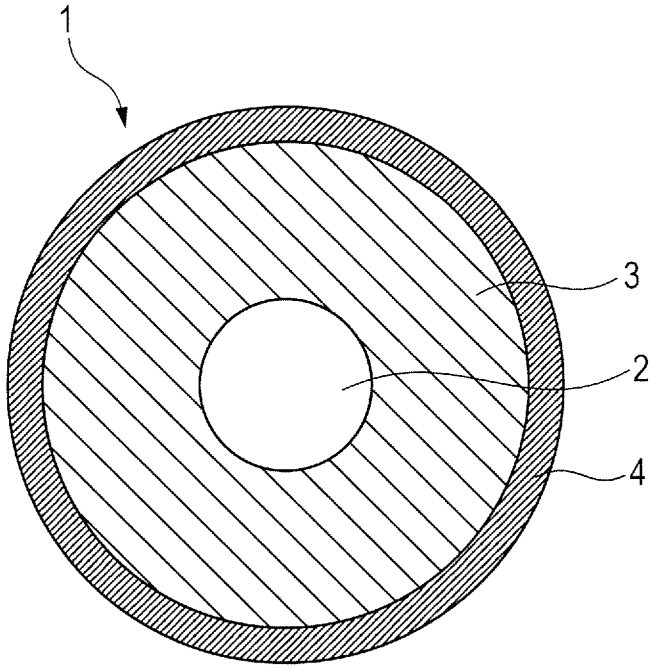
FIG. 1 is a conceptual view for illustrating an example of a developer carrying member of the present invention.

Preferred embodiments of the present invention will now be described in detail in accordance with the accompanying drawings.

Electrophotographic image forming apparatus have been used in various parts of the world and required to be able to output an electrophotographic image of high quality stably over a long period of time even in various environments. For this purpose, it is necessary that the developing member be configured so that the gradation abnormality derived from charge abnormality on a surface of the developing member, that is, an image defect such as the generation of a ghost is less liable to occur even in a severe low-humidity environment (for example, temperature: 10° C., relative humidity: 5% (5% RH), absolute humidity: 0.47 g/m$^3$). It is also necessary that the developing member be configured so that an image defect derived from sticking of a toner onto the surface of the developing member, that is, filming is less liable to occur even in a high-temperature and high-humidity environment (for example, temperature: 40° C., relative humidity: 95% (95% RH), absolute humidity: 48.5 g/m$^3$).

In the low-humidity environment, the abundance of water in air is low. Therefore, the charge on the surface of the developing member generated at a time of output of an image becomes difficult to move and is liable to accumulate. When the charge accumulates excessively on the surface of the developing member, there is a risk in that abnormality of an image density may be caused to impair the quality of an electrophotographic image. In particular, in polytetramethylene glycol having a particular structure disclosed in Japanese Patent Application Laid-Open No. 2014-29499, there has been a room for improvement in the severe low-humidity environment (for example, temperature: 10° C., relative humidity: 5% (5% RH), absolute humidity: 0.47 g/m$^3$) due to the low water content ratio.

Further, in the high-temperature and high-humidity environment (for example, temperature: 40° C., relative humidity: 95% (95% RH)), tackiness is generally expressed on the surface of the developing member formed of a polymer compound. In the particular polytetramethylene glycol structure, the water content ratio is low, and hence the tackiness can be suppressed. However, a decrease in ratio of the polytetramethylene glycol structure in a polymer film leads to the expression of the tackiness. In the case where a polymer material having significant tackiness is arranged on the surface of the developing member, a toner to be carried on the surface of the developing member becomes difficult to roll and is liable to rotate together with the developing member. In this case, the same region of the toner is continuously exposed to stress from other contact members. When this situation continues, the toner may stick to (filming) the surface of the developing member due to the excessive stress from the other contact members to have an adverse effect on an image.

The inventors of the present invention have earnestly conducted research and investigations. As a result, the inventors of the present invention have found that residual charge is less liable to accumulate and a toner is less liable to cause filming on a surface of a developer carrying member by using a modified acrylic urethane resin having a particular structure in a surface layer of the developer carrying member. Thus, the present invention has been attained.

As illustrated in FIG. 1, the developer carrying member according to the present invention has such a configuration that an elastic layer 3 is formed on an outer peripheral surface of a substrate 2, and a surface of the elastic layer 3 is covered with a surface layer 4.

(Substrate)

An electroconductive substrate 2 serves as an electrode and a support member of a developer carrying member 1 and is formed of an electroconductive material such as: a metal or an alloy such as aluminum, a copper alloy, or stainless steel; iron plated with chromium or nickel; or a synthetic resin having conductivity.

It should be noted that, in order to enhance the adhesive property between the substrate 2 and the elastic layer 3 described later, a primer may be applied to a surface of the substrate 2. Examples of the primer include a silane coupling agent-based primer, and thermosetting resins or thermoplastic resins such as urethane-based, acrylic, polyester-based, polyether-based, or epoxy-based resins.

Further, the following are given as a commercially available primer: "DY39-051", "DY39-012", and "DY39-115" (all of which are trade names: manufactured by Dow Corning Toray Co., Ltd.); "X-33-173", "PRIMER-NO. 4", "PRIMER-NO. 32", and "PRIMER-NO. 35" (all of which are trade names: manufactured by Shin-Etsu Chemical Co., Ltd.); and "XP81-405", "XP81-A6361", "XP81-B7015", "ME21", "ME151", "ME153", and "XC9214" (all of which are trade names: manufactured by Momentive Performance Materials Japan LLC).

A known alkoxysilane, titanate ester, or the like may be added to the primer in order to enhance the adhesive property thereof. Specific examples thereof include tetramethoxysilane, tetraethoxysilane, tetra-n-butoxysilane, tetraethoxytitanium, tetraisopropoxytitanium, and tetra-n-butoxytitanium. The amount thereof added is preferably from 0.1 part by mass to 20 parts by mass with respect to 100 parts by mass of the commercially available primer.

(Elastic Layer)

The elastic layer 3 imparts, to the developer carrying member, such hardness or elasticity that the developer carrying member is pressed against a photosensitive member with a proper nip width and a proper nip pressure so that a toner can be supplied in a proper amount to an electrostatic latent image formed on a surface of the photosensitive member. In ordinary cases, the elastic layer 3 is formed of a molded body of a rubber material.

As the rubber material, various rubber materials used hitherto in electroconductive rubber rollers can be used. Specific examples of the rubber to be used for the rubber material include an ethylene-propylene-diene copolymerized rubber (EPDM), an acrylonitrile-butadiene rubber (NBR), a chloroprene rubber (CR), a natural rubber (NR), an isoprene rubber (IR), a styrene-butadiene rubber (SBR), a fluororubber, a silicone rubber, an epichlorohydrin rubber, a hydrogenated product of NBR, a polysulfide rubber, and a urethane rubber. One kind of those rubber materials may be used alone, or two or more kinds thereof may be used as a mixture. Of those, a silicone rubber is preferably used particularly from the viewpoint of stability against deformation such as setting performance. Examples of the silicone rubber include polydimethylsiloxane, polymethyltrifluoropropylsiloxane, polymethylvinylsiloxane, polyphenylvinylsiloxane, and copolymers of those polysiloxanes.

A thickness of the elastic layer 3 falls within a range of preferably from 1.0 mm to 8.0 mm, more preferably from 2.0 mm to 5.0 mm.

The elastic layer 3 may be formed of a plurality of layers. Further, an intermediate layer may be formed between the substrate 2 and the elastic layer 3 and between the elastic layer 3 and the surface layer 4. Further, one or more other resin layers or one or more protective layers may be laminated on an outer periphery of the surface layer 4.

Various additives such as a conductivity-imparting agent, a non-electroconductive filler, a crosslinking agent, and a catalyst may be appropriately blended into the elastic layer 3. Fine particles of carbon black, of an electroconductive metal such as aluminum or copper, or of an electroconductive metal oxide such as zinc oxide, tin oxide, or titanium oxide can be used as the conductivity-imparting agent. Of those, carbon black is particularly preferred because the carbon black in a relatively small addition amount provides good conductivity.

When the carbon black is used as the conductivity-imparting agent, the carbon black is more preferably blended in an amount of from 10 parts by mass to 80 parts by mass with respect to 100 parts by mass of the rubber in the rubber material. Examples of the non-electroconductive filler include silica, quartz powder, titanium oxide, zinc oxide, and calcium carbonate. Examples of the crosslinking agent include di-t-butyl peroxide, 2,5-dimethyl-2,5-di(t-butylperoxy)hexane, and dicumyl peroxide. Examples of the catalyst include a platinum-based catalyst, a rhodium-based catalyst, and a palladium-based catalyst. In particular, a platinum-based catalyst is preferred.

(Surface Layer)

The surface layer 4 according to the present invention contains a modified acrylic urethane resin, and the modified acrylic urethane resin has a constituent unit represented by the following structural formula (1).

(1)

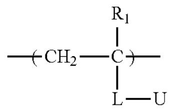

In the structural formula (1), R1 represents an alkyl group having 1 to 3 carbon atoms. U represents a urethane resin having, between two adjacent urethane bonds, a structure represented by the following structural formula (2), and at least one structure selected from a structure represented by the following structural formula (3) and a structure represented by the following structural formula (4). L represents a divalent linking group containing an ester bond (—O—C(═O)—).

(2)

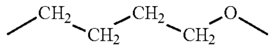

(3)

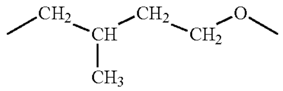

(4)

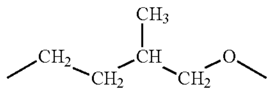

(Components of Modified Acrylic Urethane Resin)

The modified acrylic urethane resin represented by the structural formula (1) can be obtained by reacting a polyether polyol having a structure represented by the structural formula (1), and at least one structure selected from the group consisting of the structure represented by the formula (3) and the structure represented by the formula (4), an acrylic polyol, and an isocyanate.

(Polyether Polyol)

In the modified acrylic urethane resin represented by the structural formula (1), the structural unit U has, between two adjacent urethane bonds, a structure represented by the structural formula (2), and at least one structure selected from a structure represented by the structural formula (3) and a structure represented by the structural formula (4). The modified acrylic urethane resin has extremely low crystallinity in a low-temperature region by virtue of the presence of a methyl group as a side chain in the structure represented by the structural formula (3) or (4). Therefore, the developer carrying member including the surface layer containing the polyurethane according to the present invention is flexible even in a low-temperature environment, and the hardness thereof is less liable to increase. In a high-temperature region, the molecular mobility of the structural unit U in the high-temperature region is suppressed by virtue of the presence of the methyl group as the side chain in the structure represented by the structural formula (3) or (4). Such a polyether polyol can be obtained by reacting tetrahydrofuran and 3-methyltetrahydrofuran.

In the modified acrylic urethane resin represented by the structural formula (1), polypropylene glycol or an aliphatic polyester may be further incorporated as required into the structural unit U as long as the effect of the present invention is not impaired. Examples of the aliphatic polyester include an aliphatic polyester polyol obtained by a condensation reaction of a diol component such as 1,4-butanediol or neopentyl glycol; a triol component such as trimethylolpropane; and a dicarboxylic acid such as adipic acid, glutaric acid, or sebacic acid.

(Acrylic Polyol)

In the modified acrylic resin represented by the structural formula (1), the structural unit L contains an ester bond derived from an acrylic polyol.

In general, a monomer of an acrylic polyol is a (meth)acrylate having a hydroxyl group and is obtained as a reaction product of a polyol and (meth)acrylic acid. The reaction product has a hydroxyl group and an acrylic acid ester structure. A modified structure can be introduced by causing the hydroxyl group to react with various compounds. For example, a hydroxy(meth)acrylate having a lactone-modified structure is obtained by causing the hydroxyl group and lactone to react with each other.

In the (meth)acrylate, a double bond portion derived from acrylic acid is polymerized to generate an acrylic polyol. Further, when the acrylic acid derivative is copolymerized with a vinyl monomer having an unsaturated component such as styrene, an acrylic polyol as a copolymer can be obtained.

As the monomer for providing the structure of the structural formula (1), specific examples of the (meth)acrylate having a hydroxyl group are given below. There may be given hydroxy esters having 2 to 8 carbon atoms of (meth) acrylic acid, such as hydroxymethyl (meth) acrylate, hydroxyethyl (meth) acrylate, hydroxypropyl (meth)acrylate, and hydroxylbutyl (meth)acrylate, and those hydroxy esters can also be used in combination. Further, the lactone-modified acrylic polyol obtained by the reaction between lactone and the (meth)acrylate having a hydroxyl group can be suitably used, and a copolymer of (meth)acrylate containing a lactone-modified hydroxyl group and styrene can be particularly suitably used.

(Isocyanate)

The polyisocyanate component to be caused to react with the polyol components is not particularly limited and examples thereof may include: aliphatic polyisocyanates such as ethylene diisocyante and 1,6-hexamethylene diisocyante (HDI); alicyclic polyisocyanates such as isophorone diisocyanate (IPDI), cyclohexane 1,3-diisocyanate, and cyclohexane 1,4-diisocyanate; aromatic isocyanates such as 2,4-tolylene diisocyanate, 2,6-tolylene diisocyanate (TDI), 4,4'-diphenylmethane diisocyanate (MDI), polymeric diphenylmethane diisocyanate (p-MDI), xylylene diisocyanate, and naphthalene diisocyanate; and copolymers thereof, isocyanurates thereof, TMP adducts thereof, biuret compounds thereof, and blocked compounds thereof.

Of those, there are more suitably used aromatic isocyanates such as tolylene diisocyanate, diphenylmethane diisocyanate, and polymeric diphenylmethane diisocyanate.

(Synthesis of Modified Acrylic Urethane Resin)

For the synthesis of the polyurethane resin, the following kinds of methods are generally used.

(i) A one-shot method involving mixing a polyol and a polyisocyanate to cause a reaction.

(ii) A method involving subjecting an isocyanate group-terminated prepolymer, which is obtained by subjecting part of a polyol to a reaction with an isocyanate, to a reaction with a chain extender such as a low-molecular-weight diol or a low-molecular-weight triol.

In the modified acrylic urethane resin represented by the structural formula (1), it is preferred that the amount of components other than the structure represented by the structural formula (2), the structure represented by the structural formula (3), and the structure represented by the structural formula (4) between the two adjacent urethane bonds included in the structural unit U be smaller. Specifically, from the viewpoint of expressing the effect of the present invention, it is preferred that the content rate of the components be 5 parts by mass or less in the modified acrylic urethane resin structure.

A mixing ratio of the polyisocyanate to be caused to react with the polyol in terms of an isocyanate group ratio preferably falls within the range of from 1.2 to 4.0 with respect to 1.0 of a hydroxyl group of the polyol.

The surface layer preferably has conductivity. Means for imparting the conductivity is, for example, the addition of an ionic electroconductive agent or electroconductive fine particles. Of those, electroconductive fine particles are suitably used because the fine particles are available at a low cost and each show a small fluctuation in resistance due to an environment, and carbon black is particularly preferred from the viewpoints of conductivity-imparting property and reinforcing property. With regard to the properties of the electroconductive fine particles, carbon black having a primary particle diameter of 16 nm or more to 50 nm or less, and a DBP oil absorption of 50 ml/100 g or more to 160 ml/100 g or less is preferred because a balance among its conductivity, hardness, and dispersibility is good.

Specific examples of the carbon black can include: electroconductive carbon blacks such as “KETJENBLACK” (trade name, manufactured by Lion Corporation) and acetylene black; and carbon blacks for rubber such as SAF, ISAF, HAF, FEF, GPF, SRF, FT, and MT. In addition, an oxidatively-treated carbon black for color ink, or a pyrolytic carbon black can be used. One kind of those carbon blacks may be used alone, or two or more kinds of them may be used in combination. It is preferred that the content of the carbon black to be added to the surface layer be 10 parts by mass or more to 30 parts by mass or less with respect to 100 parts by mass of the resin components forming the surface layer.

Besides the above-mentioned carbon blacks, as an electroconductive agent that can be used, there may be given the following: natural or artificial graphite; powder of a metal such as copper, nickel, iron, or aluminum; powder of a metal oxide such as titanium oxide, zinc oxide, or tin oxide; and an electroconductive polymer such as polyaniline, polypyrrole, or polyacetylene. One kind of those electroconductive agents may be used alone, or two or more kinds thereof may be used in combination, as required.

The surface layer 4 can contain a crosslinking agent, a plasticizer, a filler, an extender, a vulcanizing agent, a vulcanizing aid, a crosslinking aid, an antioxidant, an age resistor, a processing aid, or a leveling agent as required, without impairing the effect of the present invention.

(Reduction in Residual Charge in Severe Low-Temperature Environment)

The urethane resin, which has the structure represented by the structural formula (2) and at least one structure selected from the structure represented by the structural formula (3) and the structure represented by the structural formula (4) present between the adjacent urethane bonds, has a methyl group at a side chain, and hence has extremely low polarity for the polyurethane. Therefore, the affinity for water of the urethane resin itself is low, and the urethane resin exhibits relatively low water-absorbing property. In a low-humidity environment, the affinity for water of the urethane resin itself is low due to the low polarity, and hence residual charge is less likely to be attenuated at a time of formation of an image. Then, in a severe low-humidity environment, the residual charge becomes predominant, as compared to the attenuation of charge, and the charge accumulates, with the result that an image of a density different from a desired one is output.

In general, there has been known a polymer material that prevents charging easily. As such a chemical structure, there is given a polyether ester amide structure. In the present invention, the polyether ester amide structure having a function of preventing charging is incorporated. Therefore, it is considered that the accumulation of residual charge is suppressed even in the severe low-humidity environment.

(Suppression of Tackiness in Severe High-Temperature and High-Humidity Environment)

As described above, the surface layer according to the present invention contains an ester bond. Therefore, the tackiness is expected to increase in a high-temperature and high-humidity environment, as compared to the case of using the urethane resin having the structure represented by the structural formula (2) and at least one structure selected from the structure represented by the structural formula (3) and the structure represented by the structural formula (4) present between the adjacent urethane bonds. On the other hand, Japanese Patent No. 3360432 discloses a technology of suppressing the tackiness of the polyurethane by incorporating an acrylic structure into the urethane resin.

The surface layer according to the present invention contains a modified acrylic urethane resin, and the modified acrylic urethane resin has a constituent unit represented by the structural formula (1). The surface layer contains an acrylic structure as well as the polyether ester amide structure. It is considered that the acrylic structure suppresses the tackiness in the high-temperature and high-humidity environment, and thus filming of a toner on the surface of the developer carrying member is suppressed.

(Blending Ratio of Materials)

In the present invention, from the viewpoint of both reducing residual charge in the severe low-humidity environment and suppressing the tackiness in the severe high-temperature and high-humidity environment, it is necessary that the ether structure, the ester structure, and the acrylic structure be present in an appropriate ratio. As a result of investigations made by the inventors of the present invention, it has been found that both the reduction in residual charge and the suppression of tackiness can be satisfied at a high level when number of moles (A) of a hydroxyl group in a modified acrylic polyol as a material for the modified acrylic resin and number of moles (B) of hydroxyl groups in all polyols as materials for the surface layer other than the modified acrylic polyol satisfy the following formula (1).

$$10.5 \leq (B)/(A) \leq 50 \qquad (1)$$

That is, in the case where the ratio (B)/(A) is smaller than 10.5, the ratio of the acrylic structure in the polymer material becomes large. Therefore, it is expected that the hardness as the polymer film may increase to enhance stress on a toner, resulting in toner fusion.

On the other hand, in the case where the ratio (B)/(A) is larger than 50, the ratio of the ester structure in the polymer material becomes small. Therefore, it is expected that, in order to obtain a more preferred image, it may be necessary to raise the level of the effect of preventing charging.

Further, it is known that the urethane resin generally has a microphase-separated structure of a soft segment formed of a polyol chain and the like and a hard segment having a strong aggregation force formed of a urethane bond portion.

When urethane bonds are brought into proximity to each other spatially, the urethane bonds aggregate with each other due to the interaction derived from a hydrogen bond, and hence the degree of the microphase separation between the hard segment and the soft segment tends to increase further. When the hard segments aggregate with each other at a high level, the crystallinity is expressed, and a glass transition point (Tg) increases. An increase in Tg causes an increase in storage elastic modulus particularly in the low-temperature region, and hence there is a risk in that the stress on a toner may increase in the low-temperature region.

In order to dissolve the phase separation state between the hard segment and the soft segment, it is considered to be effective to devise the structure of the acrylic polyol so as to increase the spatial distance between the urethane bonds. To this end, in an acrylic polyol having a relatively short side chain, it is effective to extend the side chain. With this, it is expected that the aggregation of the hard segments may be suppressed and suitable flexibility may be expressed even in the low-temperature region. From this viewpoint, it is preferred that the modified acrylic urethane resin contain a lactone-modified acrylic urethane resin.

Further, it is expected that the aggregation of the urethane bonds may be further suppressed due to the spatial spread of a styrene group caused by introducing a styrene structure into the modified acrylic urethane resin. With this, it is expected that the aggregation of the hard segments may be further suppressed, and more suitable flexibility may be expressed even in the low-temperature region. An increase in hardness of the surface and the accumulation of residual charge can be prevented. From this viewpoint, it is preferred that the modified acrylic urethane resin have a styrene structure.

(Coating of Surface Layer)

It is preferred that the thickness of the surface layer 4 fall within a range of from 1 μm to 100 μm.

As a method of forming the surface layer 4, there is given, for example, spray, dip, or roll coating with a paint. Of those, dip coating, i.e., such a method involving causing a paint to overflow from the upper end of a dipping tank as described in Japanese Patent Application Laid-Open No. S57-5047 is simple and excellent in production stability as a method of forming a polymer resin layer and is generally used.

Figure 4:
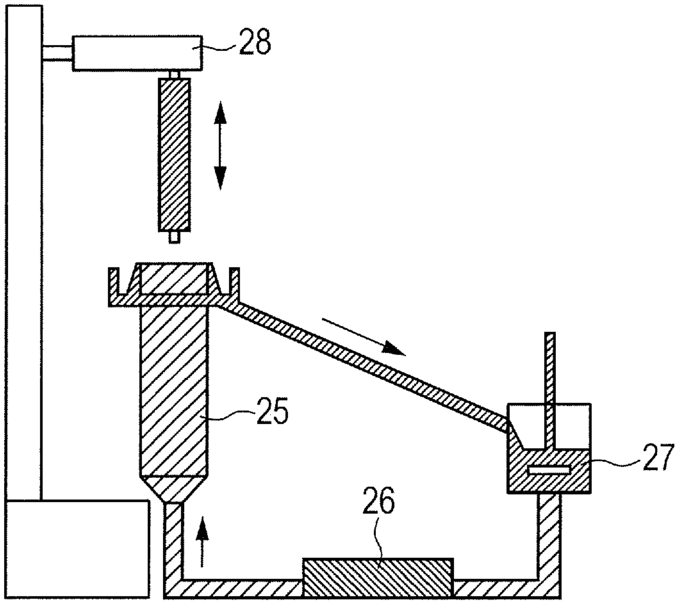
FIG. 4 is a conceptual view for illustrating an example of a liquid circulation-type dip coating apparatus.

FIG. 4 is a schematic view of a dip coating apparatus. The dip coating apparatus includes a cylindrical dipping tank 25, which has an inner diameter slightly larger than an outer diameter of the developer carrying member and a depth larger than an axial length of the developer carrying member. An annular liquid receiving portion is provided on an upper edge outer periphery of the dipping tank 25 and connected to a stirring tank 27. In addition, a bottom portion of the dipping tank 25 is connected to the stirring tank 27. A paint in the stirring tank 27 is fed to the bottom portion of the dipping tank 25 through a liquid feeding pump 26. The paint overflows an upper end of the dipping tank 25 to return to the stirring tank 27 through the liquid receiving portion on the upper edge outer periphery of the dipping tank 25. The substrate having the elastic layer 3 is vertically fixed to a lifting and lowering device 28. The substrate 2 is dipped into and raised from the dipping tank 25, and thus the surface layer 4 is formed.

The developer carrying member of the present invention is applicable to any one of, for example, a noncontact-type developing device and a contact-type developing device each using a magnetic one-component developer or a non-magnetic one-component developer, and a developing device using a two-component developer.

(Electrophotographic Process Cartridge and Electrophotographic Image Forming Apparatus)

An electrophotographic process cartridge of the present invention includes a developing member and a photosensitive member arranged so as to be held in abutment against the developing member, and is removably mounted onto a main body of an electrophotographic image forming apparatus. The electrophotographic process cartridge includes, as the developing member, the developer carrying member according to the present invention. Further, an electrophotographic image forming apparatus of the present invention includes a photosensitive member arranged so as to be held in abutment against the developer carrying member of the present invention. The electrophotographic process cartridge and the electrophotographic image forming apparatus of the present invention are not limited to a copying machine, a fax machine, or a printer as long as they include the developer carrying member of the present invention.

Figure 2:
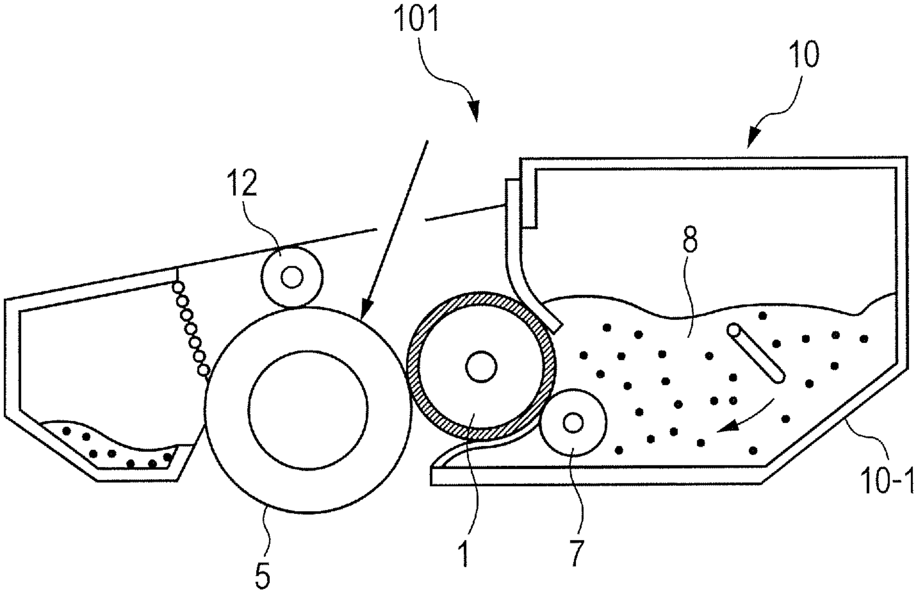
FIG. 2 is a schematic configuration view for illustrating an example of an electrophotographic process cartridge of the present invention.

As an example of the electrophotographic process cartridge and the electrophotographic image forming apparatus of the present invention including the developer carrying member according to the present invention, a printer using a nonmagnetic one-component developing type process is described below. FIG. 2 shows a cross-sectional view of a process cartridge according to the present invention. In the process cartridge 101, a developing device 10 includes a developing container 10-1 containing a nonmagnetic toner 8 as a one-component toner and the developer carrying member 1. The developer carrying member 1 is positioned in an opening that extends in a longitudinal direction in the developing container and set so as to be opposed to a photosensitive member 5. The developing device 10 develops an electrostatic latent image on the photosensitive member 5 to form a toner image. The process cartridge 101 further comprises a toner supply roller 7 and charging roller 12.

Figure 3:
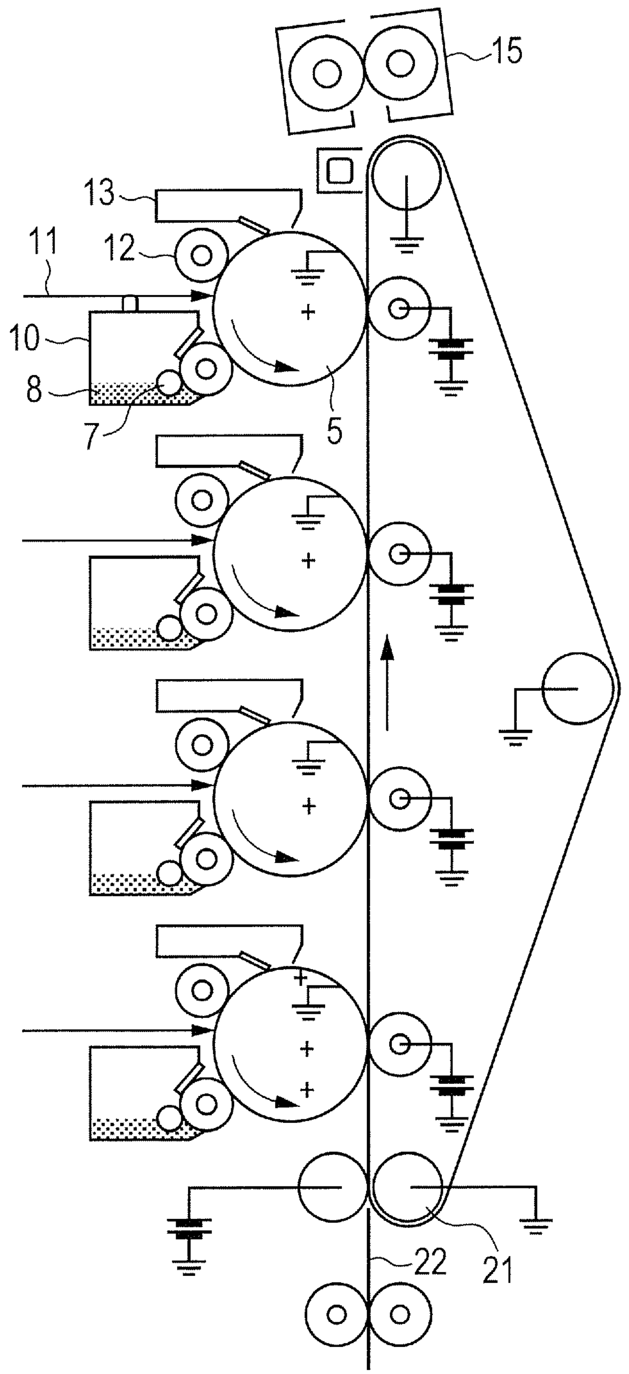
FIG. 3 is a schematic configuration view for illustrating an example of an electrophotographic image forming apparatus of the present invention.

FIG. 3 shows a cross-sectional view of an electrophotographic image forming apparatus. The electrophotographic image forming apparatus includes the photosensitive member 5 that is rotated by a rotary mechanism (not shown). A charging member 12 configured to charge a surface of the photosensitive member 5 to a predetermined polarity and potential and an image exposure device (not shown) configured to form an electrostatic latent image by irradiating the charged surface of the photosensitive member 5 with image exposure light 11, are arranged on the periphery of the photosensitive member 5. Further, the developing device 10 including the developer carrying member 1 of the present invention, which is configured to develop the formed electrostatic latent image by causing a toner to adhere to the electrostatic latent image, is arranged on the periphery of the photosensitive member 5. Further, a device 13 configured to clean the photosensitive member 5 after the toner image has been transferred onto paper 22 is provided. A fixing device 15 configured to fix the transferred toner image onto the paper 22 is arranged in a conveyance path of the paper 22.

EXAMPLES

Now, Examples according to the present invention and Comparative Examples are specifically described.

(Measurement of Number Average Molecular Weight)

Instruments and conditions used for measurement of a number average molecular weight (Mn) in Examples are as follows:

Measurement instrument: HLC-8120GPC (trade name, manufactured by Tosoh Corporation);

Column: TSKgel SuperHZMM (trade name, manufactured by Tosoh Corporation)×2;

Solvent: THF;

Temperature: 40° C.; and

Flow rate of THF: 0.6 ml/min.

It should be noted that a 0.1 mass % THF solution was used as a measurement sample. Further, the measurement was carried out by using a refractive index (RI) detector as a detector.

A calibration curve was made by using TSK standard polystyrene (trade name: A-1000, A-2500, A-5000, F-1, F-2, F-4, F-10, F-20, F-40, F-80, or F-128; manufactured by Tosoh Corporation) as a standard sample for making the calibration curve. The number average molecular weight was determined from the retention time of the measurement sample based on the calibration curve.

(Preparation of Substrate)

A product obtained by applying and baking a primer (trade name: DY35-051; manufactured by Dow Corning Toray Co., Ltd.) on a cored bar made of SUS304 and having a diameter of 6 mm was prepared as a substrate.

(Production of Elastic Layer)

The substrate prepared above was placed in a die, and then an addition-type silicone rubber composition obtained by mixing the following materials was injected into a cavity formed in the die. Subsequently, the die was heated to subject the silicone rubber to vulcanization curing at 150° C. for 15 minutes, and then the cured product was removed from the die. After that, the curing reaction was completed by further heating the resultant at 180° C. for 1 hour. Thus, an elastic layer having a diameter of 12 mm was formed on the outer periphery of the substrate.

(Synthesis of Polyether Diol A-1)

In a reaction vessel, a mixture of 230.7 g (3.2 mol) of dry tetrahydrofuran and 68.9 g (0.8 mol) of dry 3-methyltetrahydrofuran (molar mixing ratio: 80/20) was held at a temperature of 10° C. 13.1 g of 70% perchloric acid and 120 g of acetic anhydride were added to the mixture, and then the whole was subjected to a reaction for 2.5 hours. Next, purification was performed by pouring the reaction mixture into 600 g of a 20% aqueous solution of sodium hydroxide. Further, remaining water and solvent components were removed under reduced pressure. Thus, 218 g of a liquid polyether diol A-1 was obtained. The liquid polyether diol A-1 had a number average molecular weight of about 2,000 and a hydroxyl value of 57 KOH·mg/g. The polyol subjected to study is shown in Table 1.

TABLE 1

| No. | Polyol type | Included structural formula |
|---|---|---|
| A-1 | Polyether polyol | (2) (3) (4) |

(Synthesis of Acrylic Polyol B-1)

245 parts of 2-hydroxyethyl methacrylate, 160 parts of ϵ-caprolactone, 0.2 part of hydroquinone monomethyl ether as a polymerization inhibitor, and 0.02 part of stannous chloride as a reaction catalyst were placed in a reaction vessel equipped with a stirring device, a thermometer, a reflux pipe, and an air induction pipe, and the mixture was allowed to react at 100° C. for 24 hours while air was being introduced thereto. Thus, lactone-modified 2-hydroxyethyl methacrylate was obtained.

Next, 300 parts by mass of dry methyl ethyl ketone (hereinafter sometimes abbreviated as "MEK") was supplied to a reaction vessel equipped with a stirring device, a thermometer, a reflux pipe, a dripping device, and a nitrogen gas induction pipe and heated to reflux by raising the temperature to 87° C. under a nitrogen gas stream. Then, a mixture of 50.0 parts by mass of the lactone-modified 2-hydroxyethyl methacrylate obtained in the above-mentioned operation, 50.0 parts by mass of styrene, and 0.2 part by mass of an initiator (trade name: Kayaester O; manufactured by Kayaku Akzo Corporation) was gradually dropped to the resultant dry methyl ethyl ketone over 1 hour. Then, the resultant was heated to reflux for additional 3 hours while the temperature was held at 87° C. The resultant was allowed to cool to room temperature to provide an acrylic polyol B-1. Its number average molecular weight was about 4,500, and its hydroxyl value was 80 KOH·mg/g.

(Synthesis of Acrylic Polyol B-2)

245 parts of 2-hydroxypropyl methacrylate, 160 parts of ϵ-caprolactone, 0.2 part of hydroquinone monomethyl ether as a polymerization inhibitor, and 0.02 part of stannous chloride as a reaction catalyst were placed in a reaction vessel equipped with a stirring device, a thermometer, a reflux pipe, and an air induction pipe, and the mixture was allowed to react at 100° C. for 24 hours while air was being introduced thereto. Thus, lactone-modified 2-hydroxypropyl methacrylate was obtained.

Next, 300 parts by mass of dry methyl ethyl ketone was supplied to a reaction vessel equipped with a stirring device, a thermometer, a reflux pipe, a dripping device, and a nitrogen gas induction pipe and heated to reflux by raising the temperature to 87° C. under a nitrogen gas stream. Then, a mixture of 50.0 parts by mass of the lactone-modified 2-hydroxypropyl methacrylate obtained in the above-mentioned operation, 50.0 parts by mass of styrene, and 0.2 part by mass of an initiator (trade name: Kayaester O; manufactured by Kayaku Akzo Corporation) was gradually dropped to the resultant dry methyl ethyl ketone over 1 hour. Then, the resultant was heated to reflux for additional 3 hours while the temperature was held at 87° C. The resultant was allowed to cool to room temperature to provide an acrylic polyol B-2. Its number average molecular weight was about 4,500, and its hydroxyl value was 76 KOH·mg/g.

(Synthesis of Acrylic Polyol B-3)

245 parts of 2-hydroxyethyl methacrylate, 160 parts of ϵ-caprolactone, 0.2 part of hydroquinone monomethyl ether as a polymerization inhibitor, and 0.02 part of stannous chloride as a reaction catalyst were placed in a reaction vessel equipped with a stirring device, a thermometer, a reflux pipe, and an air induction pipe, and the mixture was allowed to react at 100° C. for 24 hours while air was being introduced thereto. Thus, lactone-modified 2-hydroxyethyl methacrylate was obtained.

300 parts by mass of dry methyl ethyl ketone was supplied to a reaction vessel equipped with a stirring device, a thermometer, a reflux pipe, a dripping device, and a nitrogen gas induction pipe and heated to reflux by raising the temperature to 87° C. under a nitrogen gas stream. Then, a mixture of 100.0 parts by mass of the lactone-modified 2-hydroxyethyl methacrylate obtained in the above-mentioned operation, and 0.2 part by mass of an initiator (trade name: Kayaester O; manufactured by Kayaku Akzo Corporation) was gradually dropped to the resultant dry methyl ethyl ketone over 1 hour. Then, the resultant was heated to reflux for additional 3 hours while the temperature was held at 87° C. The resultant was allowed to cool to room temperature to provide an acrylic polyol B-3. Its number average molecular weight was about 3,500, and its hydroxyl value was 102 KOH·mg/g.

(Synthesis of Acrylic Polyol B-4)

245 parts of 2-hydroxypropyl methacrylate, 160 parts of ϵ-caprolactone, 0.2 part of hydroquinone monomethyl ether as a polymerization inhibitor, and 0.02 part of stannous chloride as a reaction catalyst were placed in a reaction vessel equipped with a stirring device, a thermometer, a reflux pipe, and an air induction pipe, and the mixture was allowed to react at 100° C. for 24 hours while air was being introduced thereto. Thus, lactone-modified 2-hydroxypropyl methacrylate was obtained.

300 parts by mass of dry methyl ethyl ketone was supplied to a reaction vessel equipped with a stirring device, a thermometer, a reflux pipe, a dripping device, and a nitrogen gas induction pipe and heated to reflux by raising the temperature to 87° C. under a nitrogen gas stream. Then, a mixture of 100.0 parts by mass of the lactone-modified 2-hydroxypropyl methacrylate obtained in the above-mentioned operation, and 0.2 part by mass of an initiator (trade name: Kayaester O; manufactured by Kayaku Akzo Corporation) was gradually dropped to the resultant dry methyl ethyl ketone over 1 hour. Then, the resultant was heated to reflux for additional 3 hours while the temperature was held at 87° C. The resultant was allowed to cool to room temperature to provide an acrylic polyol B-4. Its number average molecular weight was about 3,500, and its hydroxyl value was 98 KOH·mg/g.

(Acrylic Polyol B-5)

300 parts by mass of dry methyl ethyl ketone was supplied to a reaction vessel equipped with a stirring device, a thermometer, a reflux pipe, a dripping device, and a nitrogen gas induction pipe and heated to reflux by raising the temperature to 87° C. under a nitrogen gas stream. Then, a mixture of 100.0 parts by mass of 2-hydroxyethyl methacrylate and 0.2 part by mass of an initiator (trade name: Kayaester O; manufactured by Kayaku Akzo Corporation) was gradually dropped to the resultant dry methyl ethyl ketone over 1 hour. Then, the resultant was heated to reflux for additional 3 hours while the temperature was held at 87° C. The resultant was allowed to cool to room temperature to provide an acrylic polyol B-5. Its number average molecular weight was about 3,000, and its hydroxyl value was 126 KOH·mg/g.

(Acrylic Polyol B-6)

300 parts by mass of dry methyl ethyl ketone was supplied to a reaction vessel equipped with a stirring device, a thermometer, a reflux pipe, a dripping device, and a nitrogen gas induction pipe and heated to reflux by raising the temperature to 87° C. under a nitrogen gas stream. Then, a mixture of 100.0 parts by mass of 2-hydroxypropyl methacrylate and 0.2 part by mass of an initiator (trade name: Kayaester O; manufactured by Kayaku Akzo Corporation) was gradually dropped to the resultant dry methyl ethyl ketone over 1 hour. Then, the resultant was heated to reflux for additional 3 hours while the temperature was held at 87° C. The resultant was allowed to cool to room temperature to provide an acrylic polyol B-6. Its number average molecular weight was about 3,000, and its hydroxyl value was 124 KOH·mg/g. The acrylic polyols subjected to study are shown in Table 2.

TABLE 2

| No. | Monomer 1 | Monomer 2 | Monomer 3 | Hydroxyl value (KOH · mg/g) |
|---|---|---|---|---|
| B-1 | 2-Hydroxyethyl methacrylate | Caprolactone | Styrene | 80 |
| B-2 | 2-Hydroxypropyl methacrylate | Caprolactone | Styrene | 76 |
| B-3 | 2-Hydroxyethyl methacrylate | Caprolactone | — | 102 |
| B-4 | 2-Hydroxypropyl methacrylate | Caprolactone | — | 98 |
| B-5 | 2-Hydroxyethyl methacrylate | — | — | 126 |
| B-6 | 2-Hydroxypropyl methacrylate | — | — | 124 |

(Synthesis of Isocyanate Group-Terminated Prepolymer C-1)

Under a nitrogen atmosphere, in a reaction vessel, 76.7 parts by mass of polymeric MDI (trade name: MILLIONATE MT; manufactured by Nippon Polyurethane Industry Co., Ltd.) was dissolved in 80.0 parts by mass of methyl ethyl ketone. Next, 70.0 parts by mass of a methyl ethyl ketone solution of 200.0 g of the polyether diol A-1 was gradually dropped to the solution prepared in the foregoing while the temperature in the reaction vessel was held at 65° C. After the completion of the dropping, the mixture was subjected to a reaction at a temperature of 65° C. for 2 hours. The resultant reaction mixture was cooled to room temperature. Thus, 229 g of an isocyanate group-terminated urethane prepolymer B-1 was obtained. The isocyanate group-terminated urethane prepolymer B-1 had an isocyanate content of 4.7% and a solid content of 65%.

(Synthesis of Isocyanate Group-Terminated Prepolymer C-2)

Under a nitrogen atmosphere, in a reaction vessel, 76.7 parts by mass of polymeric MDI (trade name: MILLIONATE MT; manufactured by Nippon Polyurethane Industry Co., Ltd.) was dissolved in 80.0 parts by mass of methyl ethyl ketone. Next, 70.0 parts by mass of a methyl ethyl ketone solution of 200.0 g of a polyether diol (trade name: Kuraray Polyol P-2010; manufactured by Kuraray Co., Ltd.) that was a copolymer of 3-methylpentanediol and adipic acid was gradually dropped to the solution prepared in the foregoing while the temperature in the reaction vessel was held at 65° C. After the completion of the dropping, the mixture was subjected to a reaction at a temperature of 65° C. for 2 hours. The resultant reaction mixture was cooled to room temperature. Thus, 233 g of an isocyanate group-terminated urethane prepolymer B-2 was obtained. The isocyanate group-terminated urethane prepolymer B-2 had an isocyanate content of 4.8% and a solid content of 65%.

(Isocyanate C-3)

Polymeric MDI (trade name: MILLIONATE MT; manufactured by Nippon Polyurethane Industry Co., Ltd.) having an isocyanate content of 33.6% and a solid content of 100% was used.

The isocyanates subjected to study are shown in Table 3.

TABLE 3

| No. | Isocyanate type | Included structural formula | NCO % |
|---|---|---|---|
| C-1 | Polymeric MDI | (2) (3) (4) | 4.7 |
| C-2 | Polymeric MDI | Ester bond | 4.8 |
| C-3 | Polymeric MDI | — | 33.6 |

Example 1

Now, a method of manufacturing a roller-shaped developer carrying member (hereinafter sometimes referred to as “developing roller”) according to the present invention is described.

5.9 parts by mass of the acrylic polyol B-1, 137.6 parts by mass of the isocyanate group-terminated prepolymer C-1, and Carbon Black MA230 (trade name, manufactured by Mitsubishi Chemical Corporation) in an amount of 30 parts by mass with respect to the resin components were mixed with 100 parts by mass of the acrylic polyol A-1. The mixture was dissolved in methyl ethyl ketone, followed by mixing, and uniformly dispersed with a sand mill to provide a dispersion liquid 1.

As resin particles for adjusting the surface roughness, polyurethane resin particles (trade name: Dynamic Beads UCN-5150D; manufactured by Dainichiseika Color & Chemicals Mfg. Co., Ltd.) in an amount of 30 parts by mass with respect to the resin components were added to the dispersion liquid 1, followed by stirring with a stirring motor for 10 minutes. Thus, a paint 1 for forming a surface layer was obtained.

Next, the paint 1 for forming a surface layer was diluted to a solid content of 27 mass % through use of MEK and applied onto the elastic layer 3 by dip coating so that the film thickness after the formation of a surface layer became 10 μm, followed by drying. After that, the resultant was heated at 150° C. for 1 hour to provide the surface layer 4 on the outer periphery of the elastic layer 3. Thus, a developing roller of Example 1 was obtained.

Nos. of polyols and Nos. of isocyanates used as materials for the urethane resins in the surface layers of the developing rollers according to Examples 1 to 10 are shown in Table 4.

TABLE 4

| | Polyol | | | | Isocyanate | | |
|---|---|---|---|---|---|---|---|
| | | Polyol 2 | | | | | |
| Example | Polyol 1 | Name | Blending amount with respect to 100 g of polyol 1 (g) | (B)/(A) | Name | Index | Blending amount with respect to 100 g of polyol 1 (g) |
| 1 | A-1 | B-1 | 5.9 | 12 | C-1 | 1.4 | 137.6 |
| 2 | | B-2 | 6.2 | 12 | | 1.4 | 138.2 |
| 3 | | B-3 | 3.5 | 16 | | 1.4 | 135.1 |
| 4 | | B-4 | 3.6 | 16 | | 1.4 | 135.0 |
| 5 | | B-5 | 9.0 | 5 | | 1.4 | 152.0 |
| 6 | | | 1.3 | 35 | | 1.4 | 158.9 |
| 7 | | | 0.75 | 60 | | 1.4 | 129.2 |
| 8 | | B-6 | 9.2 | 5 | | 1.4 | 152.6 |
| 9 | | | 1.3 | 35 | | 1.4 | 130.7 |
| 10 | | | 0.77 | 60 | | 1.4 | 129.2 |

In Table 4, (A) represents number of moles of a hydroxyl group in the modified acrylic polyol represented by the structural formula (1), and (B) represents number of moles of hydroxyl groups in all polyols other than the modified acrylic polyol represented by the structural formula (1).

Comparative Example 1

A developing roller of Comparative Example 1 was obtained in the same manner as in Example 1 except that the polyols to be used were changed to only the polyol A-1.

Comparative Example 2

A developing roller of Comparative Example 2 was obtained in the same manner as Example 1 except that the polyols to be used were changed to only the polyester diol (trade name: Kuraray Polyol P-2010; manufactured by Kuraray Co., Ltd.) that was a copolymer of 3-methylpentanediol and adipic acid and that the isocyanate to be used was changed to the isocyanate group-terminated prepolymer C-2.

Comparative Example 3

A developing roller of Comparative Example 3 was obtained in the same manner as in Example 1 except that the polyols to be used were changed to only the polyol B-5 and that the isocyanate to be used was changed to the isocyanate group-terminated prepolymer C-2.

Comparative Example 4

A developing roller of Comparative Example 4 was obtained in the same manner as Example 1 except that the polyols to be used were changed to only the polyester diol (trade name: Kuraray Polyol P-2010; manufactured by Kuraray Co., Ltd.) that was a copolymer of 3-methylpentanediol and adipic acid and that the isocyanate to be used was changed to the isocyanate group-terminated prepolymer C-3.

Comparative Example 5

A developing roller of Comparative Example 5 was obtained in the same manner as in Example 1 except that the polyols to be used were changed to only Kuraray Polyol P-2010 (trade name, manufactured by Kuraray Co., Ltd.) and that the isocyanate to be used was changed to the isocyanate C-3.

Nos. of polyols and Nos. of isocyanates used as materials for the urethane resins in the surface layers of the developing rollers according to Comparative Examples 1 to 5 and their blending ratios are shown in Table 5.

TABLE 5

| Comparative | Polyol | | Isocyanate | | |
|---|---|---|---|---|---|
| Example | Polyol 1 | Polyol 2 | Isocyanate | Index | Blending amount with respect to 100 g of polyol 1 (g) |
| 1 | A-1 | — | C-1 | 1.4 | 127.1 |
| 2 | "P-2010" | — | C-2 | 1.4 | 120.1 |
| 3 | — | B-5 | C-2 | 1.4 | 275.1 |
| 4 | "P-2010" | — | C-3 | 1.4 | 17.2 |
| 5 | | B-5 | | 1.4 | 39.3 |

(Measurement of Roller Surface Potential)

In this study, an evaluation was made by irradiating the surface of the elastic layer with charge through use of a corona discharger and measuring actual residual charge. In the case where a large amount of the residual charge is present, the value of a potential is measured to be high. Therefore, an average potential was determined for a developing roller and used as an index for ease of charge remaining. The detail is described below.

Figure 5:
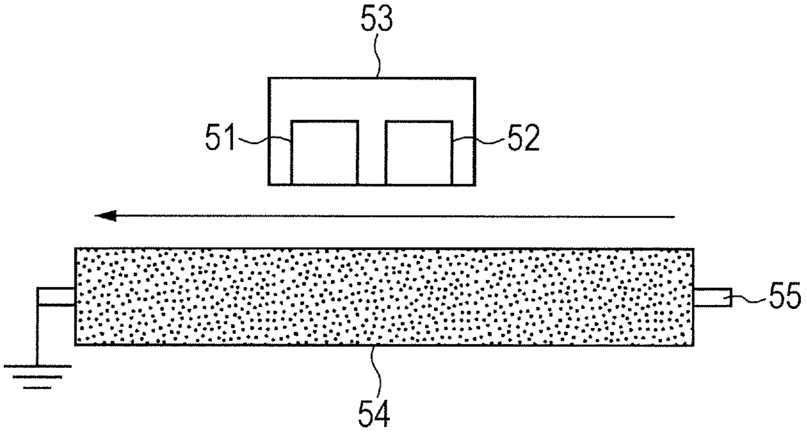
FIG. 5 is a schematic view for illustrating an example of a device configured to measure an average potential of the developer carrying member of the present invention.

As an evaluation device, DRA-2000L (trade name, manufactured by QEA, Inc.) was used. An outline of the evaluation device is described with reference to FIG. 5. The evaluation device includes a head 53 with which a corona discharger 51 and a probe 52 of a surface potential gauge are integrated. Further, the distance from a position at which discharging is performed by the corona discharger 51 to the center of the probe 52 of the surface potential gauge in the head 53 is 25 mm, and hence a delay time is caused, depending on the movement speed of the head 53, during a period of time from the completion of the discharging to the measurement. The head 53 can move in parallel with a longitudinal direction of an elastic layer roller 54 set with respect to the head 53. Further, a surface of the elastic layer roller 54 is irradiated with charge generated from the corona discharger 51.

The head 53 moves while performing corona discharging, and thus the measurement is conducted as follows.

1) The surface of the elastic layer roller 54 is irradiated with the charge from the corona discharger 51.

2) During a delay time in which the probe 52 of the surface potential gauge reaches a measurement position, the charge on the surface of the elastic layer roller 54 escapes to a ground through an electroconductive substrate 55.

3) The amount of residual charge on the surface of the elastic layer roller 54 is measured as a potential with the potential gauge.

From the above-mentioned measurement, the amount of the residual charge on the elastic layer roller 54 can be evaluated.

The operation procedure of the evaluation device is as follows.

A master made of SUS304 having the same outer diameter as that of the developing roller is set in DRA-2000L, and the master is short-circuited to the ground. Then, the distance between a surface of the master and the probe 52 of the surface potential gauge is adjusted to 0.76 mm so as to calibrate the surface potential gauge to zero.

After the above-mentioned calibration, the master is removed, and the developing roller to be measured is set in DRA-2000L.

Measurement conditions are set to a charging bias of the corona discharger 51 of 8 kV, a scanner movement speed of 400 mm/sec, and a sampling interval of 0.5 mm or less, and thus the elastic layer roller 54 is measured for a potential in the longitudinal direction. Data is collected from a range of 180 mm of a rubber portion of the elastic layer roller 54 excluding each end of 27.5 mm. The measurement is repeated 36 times by 10°, and thereby data on a potential caused by residual charge due to a corona discharge can be obtained in the measurement range.

The potential data to be obtained is expressed in matrix of m-rows and 36-columns, including as elements values of a potential obtained in the longitudinal direction arranged in a vertical direction and values of a potential obtained in each phase by 10° arranged in a horizontal direction. The numerical value of the m is determined depending on the sampling interval.

An arithmetic mean of values of all the elements in the obtained matrix, that is, m×36 elements was obtained and defined as an average potential of the developing roller.

(Evaluation Device and Image Evaluation (1))

A process cartridge for a black color for a laser printer (trade name: LBP7700C; manufactured by Canon Inc.) having a configuration as illustrated in FIG. 3 was left to stand in an environment having a temperature of 10° C. and a relative humidity of 5% RH for 24 hours.

Further, as a developing roller of the above-mentioned process cartridge, the developing roller manufactured in each Example and each Comparative Example was left to stand in an environment having a temperature of 10° C., a relative humidity of 5% RH, and an absolute humidity of 0.47 g/$m^3$ for 24 hours. After that, the developing roller was measured for a roller surface potential in the same environment. Then, the developing roller to be evaluated was mounted on the process cartridge, and the process cartridge was mounted on the laser printer. That is, the process cartridge as prepared above was loaded at a position for a black color of the laser printer in a low-temperature and low-humidity environment having a temperature of 10° C. and a relative humidity of 5% RH, and the laser printer was caused to continuously output images onto 20,000 sheets at a print percentage of 1% in an environment having a temperature of 10° C. and a relative humidity of 5% RH. Subsequently, as an image for studying a ghost, an image in which solid black marks (square and circle) were arranged at an equal interval on a white background was output onto a region corresponding to one round of the developing roller of an image end, and a half-tone image was output onto the other region. The degree of appearance of a ghost of the marks on the output half-tone image was evaluated based on the following criteria.

AA: No difference in contrasting density is recognized.

A: A slight difference in contrasting density can be confirmed depending on an observation angle.

B: A ghost of one round of the developing roller can be confirmed.

C: A ghost of one round of the developing roller can be confirmed clearly.

D: A ghost of two or more rounds of the developing roller can be confirmed.

(Evaluation Device and Image Evaluation (2))

A process cartridge for a black color for a laser printer of the above-mentioned type was prepared and left to stand in an environment having a temperature of 40° C. and a relative humidity of 95% RH for 24 hours.

Further, as a developing roller of the above-mentioned process cartridge, the developing roller to be evaluated was left to stand in an environment having a temperature of 40° C. and a relative humidity of 95% RH for 24 hours, and thereafter mounted on the process cartridge. Next, the process cartridge as prepared above was loaded at a position for a black color of the laser printer in a high-temperature and high-humidity environment having a temperature of 40° C. and a relative humidity of 95% RH, and the laser printer was caused to continuously output images at a print percentage of 1% in an environment having a temperature of 40° C. and a relative humidity of 95% RH. The images were checked at every 1,000 sheets, and the number of the sheets, at which a density difference between a printed portion and a non-printed portion caused by filming was visually confirmed, was defined as the number of sheets at which filming occurred.

the roller surface potential difference before and after the output of the images in the severe low-temperature and low-humidity environment is small. In relation to this, ghost resistance is satisfactory. On the other hand, the number of the output images up to the occurrence of filming is large even in the severe high-temperature and high-humidity environment, and hence filming resistance is satisfactory.

The foregoing means that when the modified acrylic resin of the present invention is incorporated, the accumulation of residual charge on the roller surface in the severe low-temperature and low-humidity environment is alleviated, and further the tackiness in the high-temperature and high-humidity environment is suppressed, with the result that toner filming is alleviated.

In particular, in Examples 1 to 4 in which the lactone-modified structure is incorporated into the modified acrylic urethane resin, residual charge is less liable to accumulate, and filming is also suppressed at a high level. Among others, in Examples 1 and 2 using the modified acrylic urethane resin containing the lactone-modified structure and the styrene structure, it is recognized that both satisfactory ghost resistance and satisfactory filming resistance are satisfied at a high level.

In contrast, in Comparative Examples 1 to 5, the modified acrylic resin of the present invention is not incorporated, and the roller surface potential difference before and after the output of the images in the severe low-temperature and low-humidity environment is relatively large. Further, in Comparative Examples 3 and 5 using only the acrylic polyol as a polyol, surface hardness becomes high, and a decrease in filming resistance performance is recognized.

According to the present invention, the developer carrying member capable of suppressing an adverse effect of a ghost or filming on an image even in a severe environment

TABLE 6

| | Polyol 1 | Polyol 2 | (B)/(A) | Isocyanate | Roller surface potential before output of image (V) | Roller surface potential after output of image (V) | Roller surface potential difference before and after output of image (V) | Evaluation of ghost | Number of sheets at which filming occurs (sheets) |
|---|---|---|---|---|---|---|---|---|---|
| Example 1 | A-1 | B-1 | 12 | C-1 | 1.0 | 2.5 | 1.5 | AA | 20,000 |
| Example 2 | | B-2 | 12 | | 1.0 | 2.5 | 1.5 | AA | 20,000 |
| Example 3 | | B-3 | 16 | | 1.9 | 4.1 | 2.2 | A | 19,000 |
| Example 4 | | B-4 | 16 | | 1.9 | 4.1 | 2.2 | A | 19,000 |
| Example 5 | | B-5 | 5 | | 2.5 | 4.9 | 2.4 | A | 16,000 |
| Example 6 | | | 35 | | 2.7 | 5.6 | 2.9 | A | 18,000 |
| Example 7 | | | 60 | | 3.0 | 6.4 | 3.4 | B | 18,000 |
| Example 8 | | B-6 | 5 | | 2.5 | 4.9 | 2.4 | A | 16,000 |
| Example 9 | | | 35 | | 2.7 | 5.6 | 2.9 | A | 18,000 |
| Example 10 | | | 60 | | 3.0 | 6.4 | 3.4 | B | 18,000 |
| Comparative Example 1 | A-1 | — | — | C-1 | 5.5 | 9.9 | 4.4 | C | 20,000 |
| Comparative Example 2 | "P-2010" | — | — | C-2 | 6.5 | 12.4 | 5.9 | D | 16,000 |
| Comparative Example 3 | — | B-5 | — | C-2 | 8.2 | 15.3 | 7.1 | D | 7,000 |
| Comparative Example 4 | "P-2010" | — | — | C-3 | 7.3 | 13.1 | 5.8 | D | 12,000 |
| Comparative Example 5 | | B-5 | — | | 10.2 | 20.4 | 10.2 | D | 7,000 |

In Table 6, (A) represents the number of moles of a hydroxyl group in the modified acrylic polyol represented by the structural formula (1), and (B) represents the number of moles of hydroxyl groups in all polyols other than the modified acrylic polyol represented by the structural formula (1).

In Examples 1 to 10, the surface layer contains the modified acrylic urethane resin of the present invention, and is obtained. Further, the process cartridge and the electrophotographic image forming apparatus that contribute to the formation of an electrophotographic image of high quality are obtained by using the developer carrying member according to the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-117072, filed Jun. 5, 2014, which is hereby incorporated by reference herein in its entirety.

What is claimed is:

1. A developer carrying member, comprising:

an electroconductive substrate;

an elastic layer on the substrate; and a surface layer covering a surface of the elastic layer, the surface layer containing a modified acrylic urethane resin synthesized from (i) a modified acrylic polyol containing an ester bond, (ii) an isocyanate and (iii) a polyol comprising a structure represented by formula (2), and at least one structure selected from the group consisting of formulae (3) and (4), and having a constituent unit represented by formula (1):

(1)

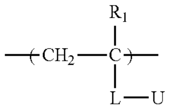

in which $R_1$ represents an alkyl group having 1 to 3 carbon atoms,

U represents a urethane resin having, between two adjacent urethane bonds, said structure represented by formula (2), and said at least one structure selected from the group consisting of formulae (3) and (4), and L represents a divalent linking group containing an ester bond (—O—C(=O)—)

(2)

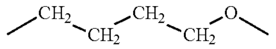

(3)

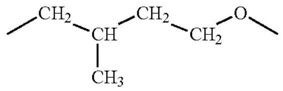

(4)

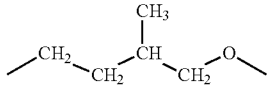

wherein 10.5≤(B)/(A)≤50 when (A) is a number of moles of a hydroxyl group in the modified acrylic polyol and (B) is a number of moles of hydroxyl groups in all polyols other than the modified acrylic polyol.

2. The developer carrying member according to claim 1, wherein the modified acrylic urethane resin comprises a lactone-modified acrylic urethane resin.

3. The developer carrying member according to claim 1, wherein the modified acrylic urethane resin further has a styrene structure.

4. An electrophotographic process cartridge, comprising:

a photosensitive member on which an electrostatic latent image is to be formed; and a developing member configured to develop the electrostatic latent image on the photosensitive member, wherein the electrophotographic process cartridge is removably mounted onto a main body of an electrophotographic image forming apparatus, and the developing member comprises the developer carrying member of claim 1.

5. An electrophotographic image forming apparatus, comprising:

a photosensitive member on which an electrostatic latent image is to be formed; and a developing member configured to develop the electrostatic latent image on the photosensitive member, wherein the developing member comprises the developer carrying member of claim 1.

* * * * *